United States Patent [19]
Loban et al.

[11] Patent Number: 5,612,741
[45] Date of Patent: Mar. 18, 1997

[54] VIDEO BILLBOARD

[75] Inventors: Jerry M. Loban, Grapevine, Tex.; Henry D. Ryng, Phoenix, Ariz.

[73] Assignee: Curtis Mathes Marketing Corporation, Dallas, Tex.

[21] Appl. No.: 148,048

[22] Filed: Nov. 5, 1993

[51] Int. Cl.$^6$ ............................ H04N 5/66; H04N 9/12
[52] U.S. Cl. .................................. 348/383; 348/840
[58] Field of Search ..................... 348/383, 744, 348/745, 748, 750, 751, 756, 758, 761, 766, 778, 779, 781, 790, 794, 806, 807, 839, 840; 345/13, 10; 340/815.4, 815.47, 815.49, 815.53; 359/455–460; H04N 9/12, 7/12, 5/66, 7/18

[56] References Cited

U.S. PATENT DOCUMENTS

| | | | |
|---|---|---|---|
| 4,295,159 | 10/1981 | Carollo et al. | 348/761 |
| 4,425,028 | 1/1984 | Gagnon et al. | |
| 4,650,286 | 3/1987 | Koda et al. | |
| 4,715,684 | 12/1987 | Gagnon. | |
| 4,739,567 | 4/1988 | Cardin | 359/460 |
| 4,749,259 | 6/1988 | Ledebuhr. | |
| 4,786,146 | 11/1988 | Ledebuhr. | |
| 4,866,530 | 9/1989 | Kalver | 348/799 |
| 4,923,280 | 5/1990 | Clausen et al. | 359/456 |
| 4,951,131 | 8/1990 | Lindahl | 348/747 |
| 5,005,950 | 4/1991 | Morin | 348/383 |
| 5,061,921 | 10/1991 | Lesko et al. | 340/815.83 |
| 5,257,017 | 10/1993 | Jones et al. | 348/744 |
| 5,296,922 | 3/1994 | Mitano et al. | 359/457 |

*Primary Examiner*—Michael Lee
*Attorney, Agent, or Firm*—Akin, Gump, Strauss, Hauer & Field, L.L.P.

[57] ABSTRACT

A video billboard 10 includes one or more projection units 12 utilizing a liquid crystal light valve projector 32 to project images onto a lenticulated lens screen 34. The types of images to be displayed, along with the time of day in which the images are to be displayed, are controlled from a remote master transmitter 24. A plurality of projection units 12(a–d) can be mounted together to provide an enlarged image display area.

31 Claims, 4 Drawing Sheets

VIDEO BILLBOARD

BACKGROUND OF THE INVENTION

1. Technical Field

This invention relates to display devices and, more particularly, to displays utilizing liquid crystal light valves.

2. Discussion

Billboards are used to display various messages typically consisting of a combination of text and graphics. Traditionally, the message has been provided by way of fixed sheets which are pasted to a backing. This traditional approach suffers from the inability to quickly change the displayed message since it requires the use of a crew to change the message. Electronic billboards provide the advantage in that it is easier to change the displayed message. The Department of Transportation Management Systems have introduced a relatively new fiber optic message signs. Other electronic billboards include the dot matrix type utilizing many individual bulbs. Within stadiums, arenas and auditoriums there presently are electronic dot matrix display devices used for instant replays, advertising and customer information. While these electronic billboards are easily changed, they suffer from a variety of problems such as lack of good graphics capabilities, poor contrast ratios and/or requiring a significant amount of power.

The present invention is drawn to solving one or more of these problems.

SUMMARY OF THE INVENTION

In accordance with the teachings of the present invention, a liquid crystal light valve provides an intense video light source for a rear projection screen of a video billboard. In the preferred embodiment, display information is communicated from a master computer to a receiver in the billboard housing which, in turn, controls the light valve. Commands may also be communicated via shared or dedicated landlines. The billboard is capable of providing complex video graphics with high contrast ratios. It can provide message changes on command through landline, cellular phone, satellite relay or other wireless communication links. Within the commercial advertising billboard industry it will allow the use of computer video control to change graphics easily and quickly, as desired. Advertisements, public service announcements or traffic conditions can be displayed in near real time from remote locations since images can be downloaded via the communication links and displayed at pre-programmed time slots, if desired.

Preferably, a lenticulated screen structure using multiple optical elements is employed to increase the gain of the projected light. One of the elements is a vertical black stripe lenticular lens whereas the other element is a combined Fresnel and horizontal lenticular optical element. The outside surface of the screen is in the form of a protective sheet which includes horizontal louvers.

It is envisioned that the billboard may be constructed of a plurality of substantially identical projection unit modules. As a result, the size of the ultimately constructed billboard can be easily modified, as desired, by utilizing a different number of projection unit modules.

BRIEF DESCRIPTION OF THE DRAWINGS

The various advantages of the present invention will become apparent to those skilled in the art after studying the following specification and by reference to the drawings in which.

DETAILED DESCRIPTION OF THE PREFERRED EMBODIMENTS

Figure 1:
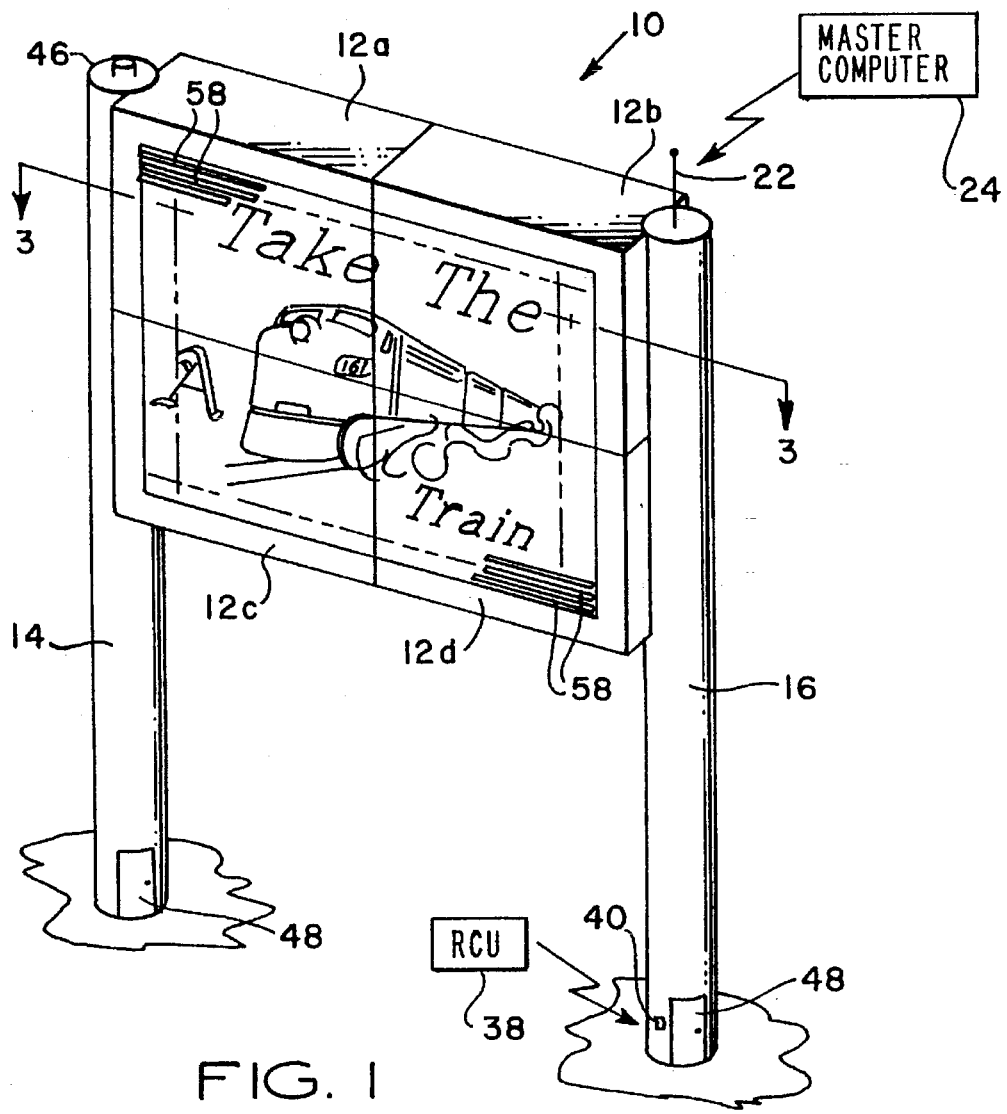
FIG. 1 is a perspective view of a video billboard made in accordance with the teachings of the present invention.

It should be understood from the outset that, while this invention is being described in connection with its preferred embodiments and best mode of practicing the invention, it is not intended that these particular teachings are to restrict the scope of this invention. With that caveat in mind, the reader's attention is first directed to FIG. 1 where a video billboard 10 is shown as including four (4) substantially identical projection unit modules 12(a–d) cooperating together to present an enlarged image area for projecting a variety of textual or graphic messages. Since, in this embodiment, each of the projection unit modules is substantially identical, only one of them will be described in detail. Suffice it to say that the general teachings of this invention are applicable to a single projection unit module or a multiplicity of units which are mounted together to form an image display area of desired size. Of course, when a multiplicity of units are used, suitable multiplexing circuitry, well known in the art, would also be used in order to coordinate the segments of the overall message to be displayed by each individual unit. In the preferred embodiment, each module is approximately 144" wide ×108" high and 96" deep. In the illustrated embodiment, the modules are bolted together to form a single unit which is 288" wide ×216" high ×96" deep with a combined image area of 18'×24'. The modules are designed so that they may be stacked four high and in an unlimited number horizontally.

Figure 3:
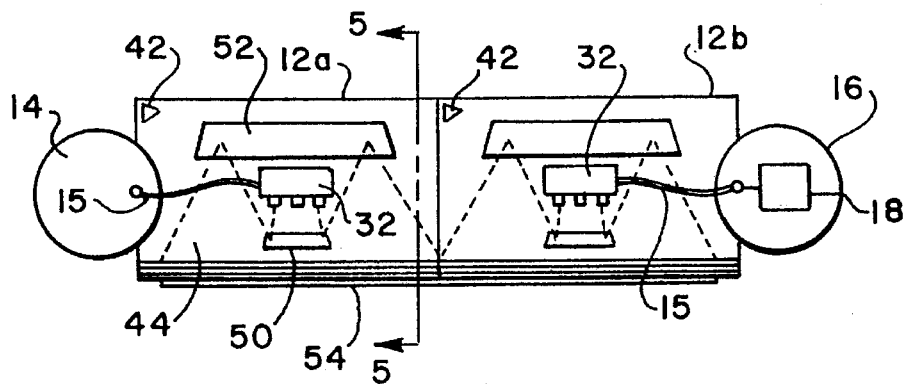
FIG. 3 is a cross sectional view taken along the lines 3—3 of FIG. 1.

The modules 12 are supported by two hollow masts 14 and 16. Masts 14 and 16 contain maintenance access within their hollow structure as well as the power and signal cabling such as cables 15 (FIG. 3). With additional reference to FIGS. 2 and 3, the masts 14 and/or 16 can also enclose a suitable receiver electronics package which is generally designated by the reference numeral 18. The receiver electronics package 18 includes a communications link 20 that communicates wirelessly via antenna 22 with a transmitter in the form of a master computer 24 via antenna 26. The communications link 20 can be provided by cellular telephone, satellite relay or other wireless transmission schemes known in the art. The billboard electronics package 18 further includes a video clip storage memory 28. Preferably, video clip storage memory 28 is a PAL, SECAM or NTSC format video storage device which serves as a graphic generator containing a plurality of programs for generating different messages to be displayed in the image area of the billboard 10. For example, clip storage memory 28 can contain programs for generating messages such as multiple advertisements, static and dynamic graphics or emergency information. The message generating programs can be downloaded from master computer 24 over link 20, along with sufficient information to determine when the message should be displayed, for how long and other pertinent data.

A video line doubler 30 serves to take advantage of the full resolution of the projection devices by effectively doubling the number of scan lines for driving the cathode ray tubes of the LCLV projectors, as discussed below.

Figure 2:
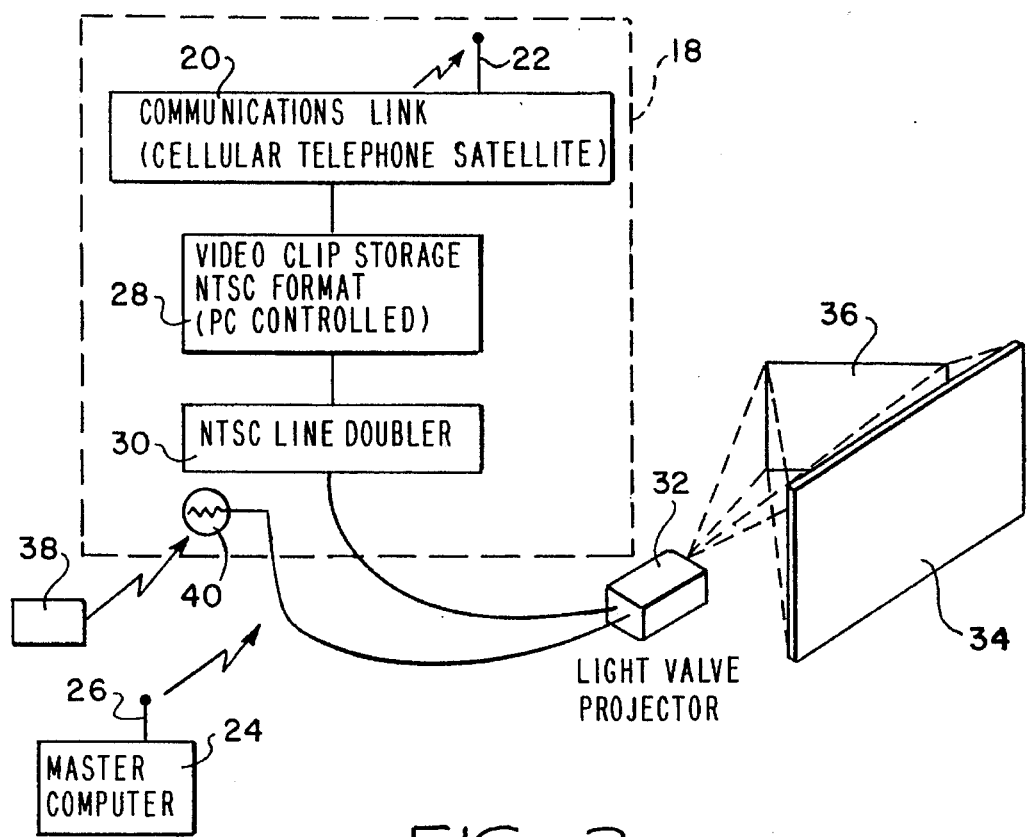
FIG. 2 is a combination perspective view and block diagram useful in understanding the general concept of this invention.

The output of line doubler 30 is connected to a liquid crystal light valve projector 32 which, in FIG. 2, is shown projecting an image onto a screen 34 via mirror 36. A liquid crystal light valve (LCLV) is utilized as the projector because it provides an extremely high contrast ratio and is bright enough that it can be used for outdoor signage in bright sunlight. Contrast ratios of at least 80:1 are supplied to the rear projection screen and an overall brightness is provided which is equal or greater than new fiber optic technology. As is known in the art, an LCLV projector utilizes an internal cathode ray tube (CRT) to control the transmissive characteristics of a liquid crystal device which, in turn, modulates light from a high intensity source to define the image projected onto the screen. Representative examples of literature describing LCLV projectors include U.S. Pat. Nos. 4,425,028; 4,786,146; 4,715,684; 4,749,259 and 4,650,286, all of which are hereby incorporated by reference. LCLV projectors of these general types are commercially available from Hughes-JVC Technology Corporation under the model designation 335S or Ampro-Greyhawk under model designation 7000S. Preferably, the projector contains a light source that provides an intensity of at least 4,000 lumens so as to generate an image of extremely high contrast ratio and intensity. For example, a 2500 watt arc lamp can be used for the light source.

A remote control unit (RCU) 38 provides an operator at the site of billboard 10 with sufficient controls to enable initial alignment of the projection system and to allow periodic realignment thereof as may become necessary. RCU 38 can, for example, include an infrared transmitter for transmitting control signals to a photo detector 40 mounted on one of the masts 14–16.

An environmental control system (ECS), represented by the reference numeral 42, is provided in each projection unit 12. The environmental control system 42 takes the form of an isolated heat pump system so that no external air is dispensed into the projection volume 44 of each module 12 which is sealed against adverse environmental conditions. ECS 42 is capable of maintaining an operating temperature of 70° F. ±15° F. with an external skin temperature of −40° F. to +140° F. ECS 42 also serves to maintain a non-operating temperature of greater than −25° F. and less than +140° F. with an external skin temperature range of −40° F. to +150° F. ECS 42 exhausts air via ducts 46, one of which is shown on mast 14. Supply air employs a combination of external ambient and air from within the mast which will allow some of the conditioned air from a positive pressure system to be used for heat exchange. The positive pressure system includes a fan and a filter (not shown) such that exit air flow is about 40% of the inlet air flow. The air flow inlets and exits are located within the support masts 14, 16 to allow access only to maintenance personnel.

Each mast has a maintenance access door 48 and internal ladder (not shown) to allow maintenance personnel to have sufficient access to allow removal and replacement of projector 32, if necessary. The projector 32 is approximately 21" high ×28" wide ×52" long, weighing a maximum of 359 pounds. It is positioned at the bottom center of each module 12 and attached to a common structure with the screen and fold mirror, as will be discussed.

Figure 4:
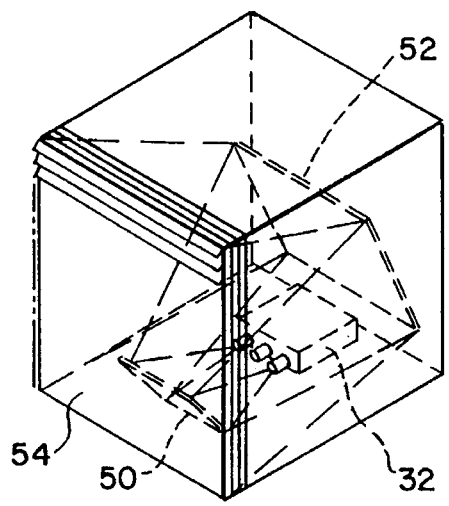
FIG. 4 is a perspective view of a projection unit module made in accordance with the teachings of the present invention.
Figure 5:
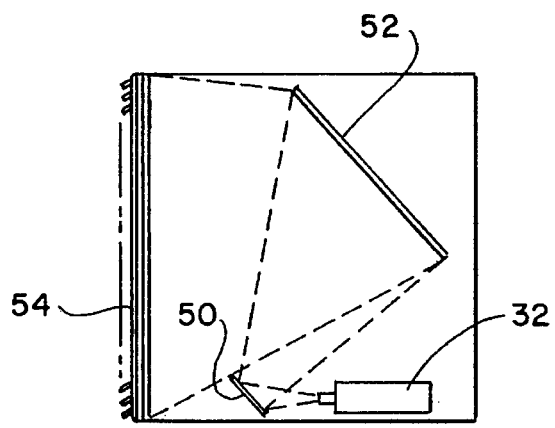
FIG. 5 is a cross sectional view of a projection unit module taken along the lines 5—5 of FIG. 3.

FIGS. 3–5 illustrate the preferred optical system for the LCLV projector 32. Light from projector 32 is reflected from a first fold mirror 50 upwardly and at an angle back towards a second fold mirror 52 which in turn reflects the image onto screen 54.

Figure 6:
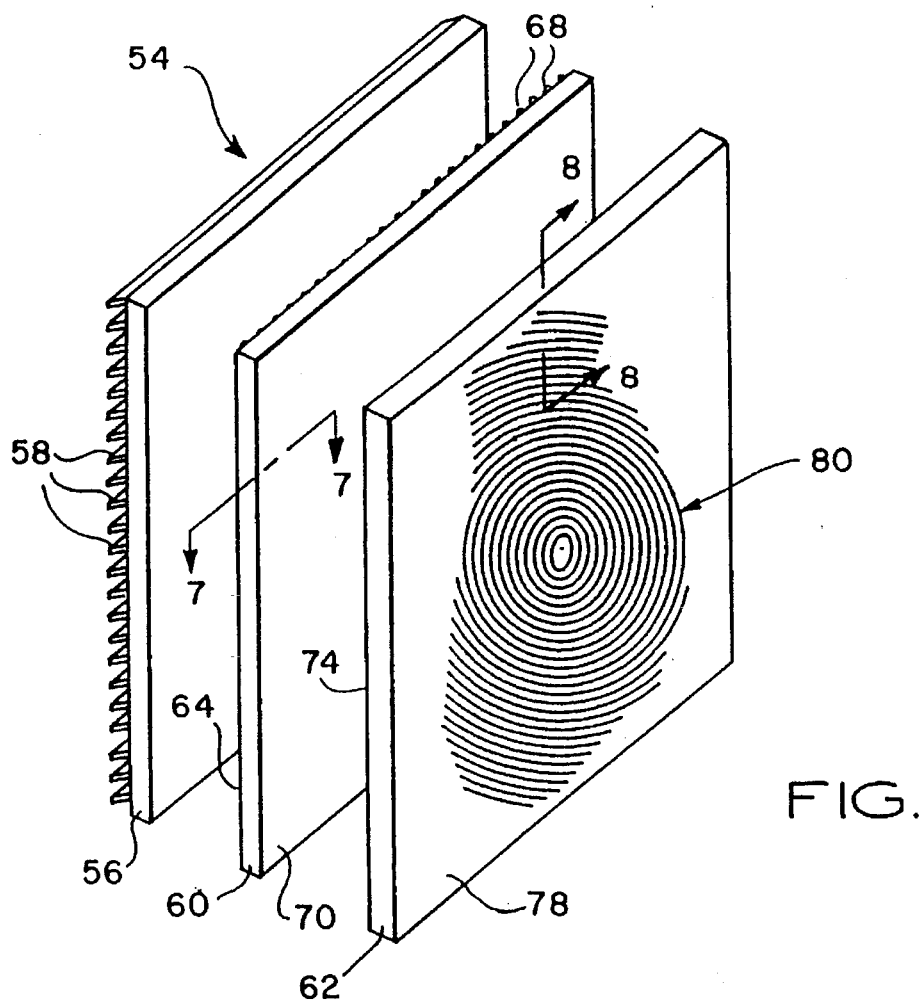
FIG. 6 is an exploded perspective view of the screen construction in accordance with the teachings of the preferred embodiment.
Figure 7:
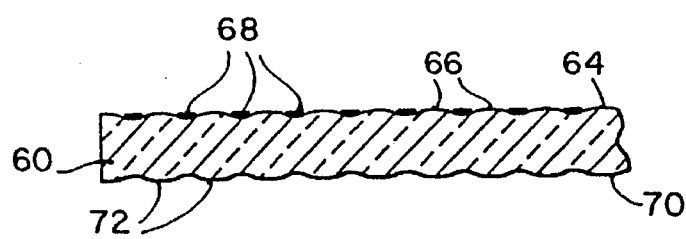
FIG. 7 is a cross sectional view of a segment of the middle plate of the screen looking downwardly along the lines 7—7 of FIG. 6.
Figure 8:
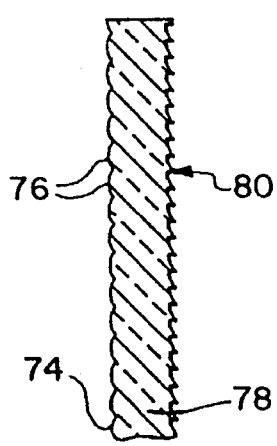
FIG. 8 is a cross sectional view of a segment of the inner plate of the screen looking along the lines 8—8 of FIG. 6.

Screen 54 is illustrated in more detail in FIGS. 6–8. Screen 54 is made up of three sheets which are laminated together to form a composite structure. Outer sheet 56 is a 0.250" thick polycarbonate shield with an ultraviolet inhibitor and a non-reflective outer surface that serves as a bullet proof shield to protect the internal lens sheets. The outer face of sheet 56 includes louvers 58 on 4" centers at a 5° downward pitch angle. Louvers 58 may be a black textured polycarbonate strips which are ultrasonically welded to the outer face of sheet 56.

Sheet 60 and sheet 62 contain multi-element lenses that provide illumination gain for the image projected on the rear of screen 54 by LCLV projector 32. Middle lens sheet 60 has an outer face 64 providing a combined black stripe and a lenticular lens structure. The lenticular lens is provided by a plurality of vertically extending spherical rib surfaces 66. Vertically extending black stripes 68 are interposed between the lenticular rib surfaces 66. The inner face 70 also includes a complementary lenticular ribbed lens structure 72. Lens sheet 60 provides a black stripe lenticular of 1.5 mm (0.059") acrylic which will provide a horizontal half gain angle of ±50° and have a reflectivity at normal incidence of less than 5.0%. It has a lenticulation pitch of 1.2 mm center to center of black stripe, with a backside lenticulation at the same pitch to gather light for horizontal dispersion.

The front face 74 of the inner lens sheet 62 includes a horizontally disposed lenticular structure provided by ribs 76 which are spaced about 0.5 mm apart to provide a ±30° vertical spread of the projected light. Rear face 78 includes a spherical Fresnel lens pattern 80 having a focal length of about 150". The Fresnel lens pattern 80 serves to collimate the light. In the preferred embodiment, lens sheet 62 is about 6.0 mm thick.

The three sheets are preferably bonded together with a suitable high viscosity adhesive such as cyanoacrylate.

In operation, the operator uses the remote control unit 38 to perform initial set up and alignment procedures. Once set up, the master computer 24 transmits sufficient information to video billboard 10 so that the message to be displayed can be changed at a moment's notice. Billboard 10 can be used by traffic management systems in metropolitan areas to communicate traffic instructions to vehicle operators. In commercial advertising, the video billboard 10 allows advertising by the minute, hour, day, month, during prime time commuter periods, as well as any other times. This provides tremendous flexibility to advertisers as to the cost and implementation of video advertisements. The combination of the liquid crystal light valve and lens structure provided by the present invention cooperate to provide very high visibility while using comparatively little power, less than 4,000 watts.

Figure 9:
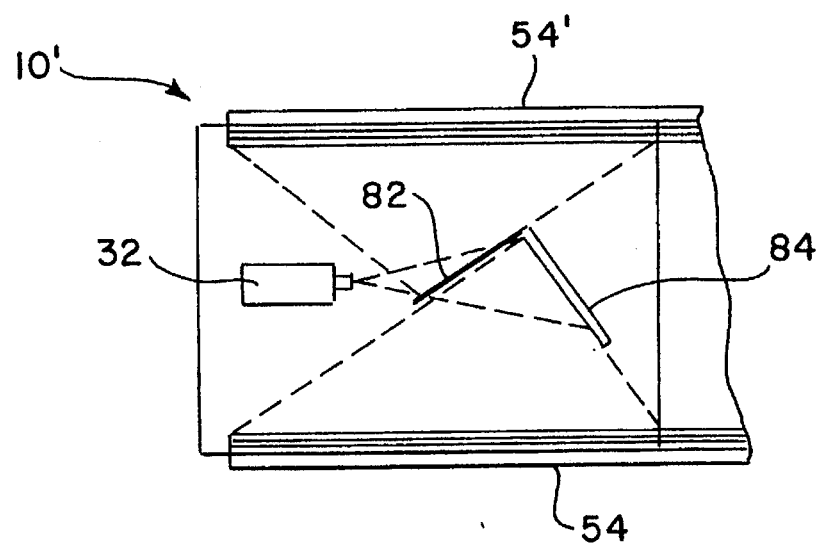
FIG. 9 is a cross sectional view of an alternative embodiment of a projection unit module having both front and rear screens.
Figure 10:
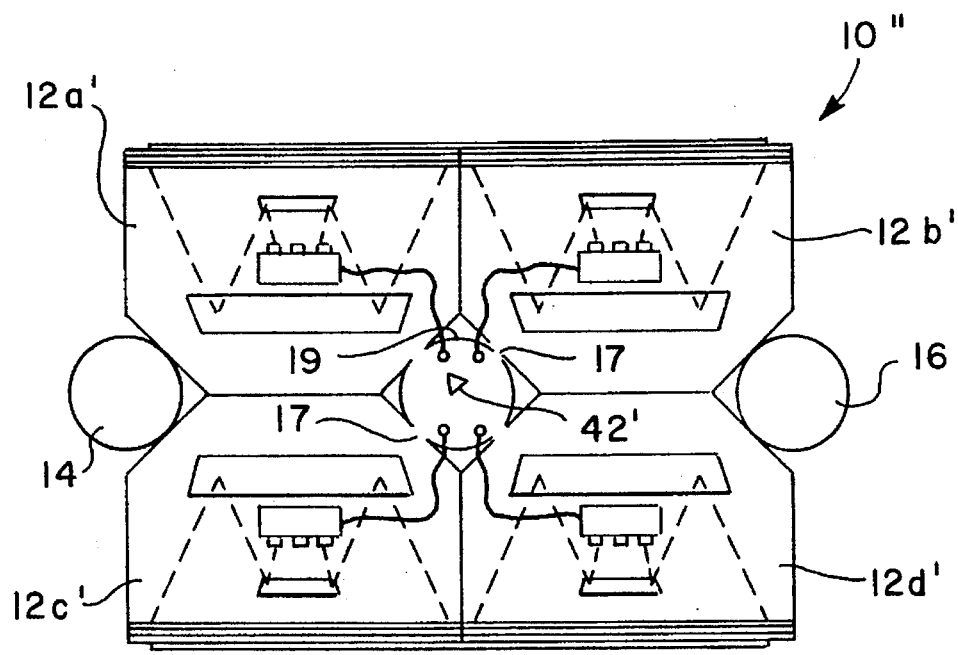
FIG. 10 is a view looking down on another embodiment of a billboard having front and rear projection screens.

Various modifications of this invention will become apparent to those skilled in the art. For example, FIG. 9 shows a dual projection system 10' which employs a 50% beam splitter 82 to reflect half of the beam intensity from projector 32 to a rear projection screen 54', while the remaining half of the beam passes through splitter 82 and is reflected from mirror 84 onto the front screen 54. In the FIG. 10 embodiment, individual projection modules 12' are mounted back-to-back to provide images on the front and rear of the billboard 10". The module housings are tapered to provide a space for receiving additional masts (e.g., 19) for supporting the modules and through which cabling and air from a centralized environmental control system 42' can be ducted into the modules through vents 17.

Still other modifications will become apparent to one skilled in the art after studying the following claims.

What is claimed is:

1. A video billboard system comprising:

a plurality of projection unit modules connected together, each projection unit module comprising a hollow housing having an interior projection volume;

a liquid crystal light valve projector mounted in each of said housings, said projector having a cathode ray tube for controlling characteristic of a liquid crystal device, said liquid crystal device modulating light from a high intensity source;

a screen for each of said projection unit modules, said screens arranged to define an enlarged image area for said billboard system and for receiving the modulated light from each of said projectors, respectively;

a receiver coupled to said projectors, respectively;

transmitter means for transmitting commands to the receivers for controlling images to be projected onto said screens;

said screens each comprising an outer protective transparent sheet, a middle lens sheet having a lenticular lens structure and an inner lens sheet having a Fresnel lens structure; and a remote control unit wirelessly coupled to said projectors for aligning images projected by said projectors onto said screens to provide an enlarged image for said billboard system.

2. The video billboard system of claim 1 wherein:

said projection unit modules are supported by a plurality of masts.

3. The video billboard of claim 2 wherein the masts are hollow and wherein cabling from the receiver to the projector runs at least partially within the hollow mast.

4. The video billboard system of claim 1 which further comprises:

an environmental control system, located within the housing of each of the projection unit modules, for maintaining the air within each of the projection volumes within predefined criteria.

5. A video billboard system comprising:

a plurality of projection unit modules, each projection unit module having a hollow housing with a liquid crystal light valve projector disposed in an interior projection volume of said housing and for projecting light having a contrast ratio of at least 80:1 onto a rear surface of a screen, said screen forming a wall of said housing;

said projection unit modules being mounted together so that the screens of the projection unit modules provide a substantially flush enlarged image area;

a plurality of hollow masts supporting the projection unit modules above ground level;

an electronics package within at least one of said hollow masts, said electronics package including a video clip storage memory for storing a plurality of preprogrammed instructions for generating different messages to be displayed on the image area of the billboard;

cabling connecting the electronics package to each of the projectors, said cabling being routed at least partially through a hollow mast;

an environmental control system comprising an isolated heat pump for regulating the environment within said projection volume of the projection unit modules, respectively, without dispensing external air into said projection volume; and transmitter means, located remotely from the billboard, for transmitting commands to the video clip storage memory for selecting images to be displayed, and the time period for which the images are to be displayed, on the image area of the billboard.

6. The billboard of claim 5 wherein the transmitter means communicates over a wireless communication link with the video clip storage memory.

7. The billboard of claim 5 wherein the screen comprises:

an outer protective sheet having a plurality of angled louvers on an outer face thereof; and a middle sheet and an inner sheet, one face of a sheet having a combined vertically extending black strip and lenticular lens structure, a second face of one of the sheets having a horizontal lenticular lens structure, and a third face on one of the sheets having a Fresnel lens structure thereon.

8. A video billboard system comprising:

plural projection units;

a liquid crystal light valve projector disposed in each of said projection units, said projector having a cathode ray tube for controlling characteristics of a liquid crystal device, said liquid crystal device modulating light from a high intensity source;

a screen for receiving the modulated light from said projector;

a receiver coupled to said projector;

transmitter means for transmitting commands to said receiver for controlling images to be projected onto said screen; and each projection unit includes front and rear screens, along with optical means for directing images from said projector onto said front and rear screens, respectively.

9. A video billboard system comprising:

a plurality of projection unit modules mounted back-to-back to provide front and rear image areas for the billboard, each projection unit module having a screen and a housing with a liquid crystal light valve projector for projecting light having a contrast ratio of at least 80:1 onto a rear surface of said screen;

said projection unit modules being mounted together so that said screens of said projection unit modules provide a substantially flush enlarged image area;

a plurality of hollow masts supporting said projection unit modules above ground level;

an electronics package within at least one of said hollow masts, said electronics package including a video clip storage memory for storing a plurality of preprogrammed instructions for generating different messages to be displayed on the image area of the billboard;

cabling connecting the electronics package to each of the projectors, said cabling being routed at least partially through a hollow mast;

an environmental control system for regulating the environment within said projection unit modules; and transmitter means, located remotely from said billboard, for transmitting commands to said video clip storage memory for selecting images to be displayed, and the time period for which the images are to be displayed, on the image area of said billboard.

10. A large scale video display apparatus comprising:

a generally hollow housing having a screen defining one wall of said housing and a projector disposed within a projection volume within said housing for projecting a video image onto said screen from a light source;

said screen comprising an outer protective transparent sheet, a middle lens sheet having a lenticular lens structure and an inner lens sheet adjacent said projection volume having a Fresnel lens structure for collimating and projecting a video image on said screen generated by said projector, said middle lens sheet and said inner lens sheet each include major inner and outer faces, said inner faces facing said projection volume and said outer faces facing the exterior of said housing, said Fresnel lens structure being located on an inner face of said inner lens sheet and said lenticular lens structure comprising a horizontal lenticular lens structure disposed on an outer face of said inner lens sheet and a vertical lenticular lens structure disposed on an outer face of said middle lens sheet.

11. The video display apparatus set forth in claim 10 including:

a plurality of horizontally extending louvers on an outer face of said outer protective sheet.

12. The video display apparatus set forth in claim 10 wherein:

said outer protective sheet is formed of a polycarbonate having an ultraviolet inhibitor therein and a non-reflective outer surface, said outer protective sheet being operable to protect said middle lens sheet and said inner lens sheet.

13. The video display apparatus set forth in claim 10 wherein:

said middle lens sheet includes generally vertically extending rib surfaces forming said vertical lenticular lens structure on said outer face and vertically extending black stripes interposed between said rib surfaces.

14. The video display apparatus set forth in claim 13 wherein:

the other face of said middle lens sheet includes complementary lenticular rib surfaces.

15. The video display apparatus set forth in claim 10 wherein:

said inner face of said inner lens sheet includes a spherical Fresnel lens pattern.

16. A video display apparatus comprising:

a hollow housing including a closed projection volume disposed therein, one wall of said housing comprising a video display apparatus screen;

a video projector disposed in said projection volume for projecting a video image on said screen, said video projector being operable to modulate light from a high intensity source; and an environmental control unit disposed in said projection volume comprising an isolated heat pump for controlling the temperature within said projection volume within a predefined range without exchanging external air into said projection volume.

17. A video display apparatus comprising:

a plurality of projection unit modules, each module including a hollow housing and each module having a closed projection volume, one wall of each of said housings comprising a video display apparatus screen;

a video projector disposed in each of said projection volumes for projecting a video image on said screen, said video projector being operable to modulate light from a high intensity source, said projection unit modules being mounted back to back to provide front and rear image areas for said video display apparatus, and an environmental control unit disposed in each of said projection volumes comprising an isolated heat pump for controlling the temperature within said projection volumes within a predefined range without exchanging external air into said projection volumes.

18. The video display apparatus set forth in claim 17 wherein:

said projection unit modules are mounted on spaced apart masts and a portion of said environmental control system is disposed in at least one of said masts and is operable to conduct heat exchange air through duct means disposed in said one mast.

19. A video billboard system comprising:

at least one projection unit module comprising a hollow housing having an interior projection volume;

a liquid crystal light valve projector mounted in said housing, said projector having a cathode ray tube for controlling characteristics of a liquid crystal device, said liquid crystal device modulating light from a high intensity source;

a screen for receiving the modulated light from said projector;

a receiver coupled to said projector;

transmitter means for transmitting commands to the receiver for controlling images to be projected onto said screen; and said screen comprising an outer protective transparent sheet, a middle lens sheet having a lenticular lens structure and an inner lens sheet having a Fresnel lens structure, said sheets having respective inner faces facing said projection volume and outer faces facing the exterior of said at least one module, said Fresnel lens structure is located on an inner face of the inner lens sheet; and said lenticular lens structure comprises a horizontal lenticular lens structure located on an outer face of the inner lens sheet and a vertical lenticular lens structure located on an outer face of the middle lens sheet.

20. The video billboard structure of claim 19 which further comprises:

a plurality of black stripes vertically spaced along the outer face of the middle lens sheet.

21. The video billboard system of claim 20 which further comprises a plurality of horizontally disposed louvers on an outer face of the outer protective sheet.

22. A large scale video display apparatus for projecting video images onto opposed screens comprising:

a projection unit module comprising a hollow housing, opposed walls of said housing forming image projecting screens, each of said screens being made up of an outer protective sheet and at least one inner lens sheet defining at least one of a lenticular lens structure and a Fresnel lens structure, said hollow housing defining a projection volume;

a projector disposed in said projection volume for generating a modulated light image from a high intensity source;

a beam splitter disposed in said projection volume for reflecting approximately half of a beam generated by said projector toward one of said screens while the remaining half of said beam passes through said beam splitter; and a mirror disposed in said projection volume for receiving said remaining half of said beam and for projecting said remaining half of said beam onto the other of said screens.

23. The video display apparatus set forth in claim 22 wherein:

said projector comprises a liquid crystal light valve projector for projecting modulated light onto both of said screens by way of said beam splitter and said mirror.

24. The video display apparatus set forth in claim 22 wherein:

said at least one inner lens sheet includes a Fresnal lens structure formed on an inner face thereof and a horizontal lenticular lens structure formed on an outer face thereof.

25. The video display apparatus set forth in claim 24 wherein:

each of said screens includes a middle lens sheet disposed between said inner lens sheet and said outer protective sheet and comprising a vertical lenticular lens structure formed thereon.

26. The video display apparatus set forth in claim 22 including:

an environmental control system disposed in said projection volume for controlling the temperature within said projection volume within a predefined range without exchanging external air into said projection volume.

27. The video display apparatus set forth in claim 26 wherein:

said environmental control system includes an isolated heat pump disposed at least partially in said projection volume.

28. The video display apparatus set forth in claim 22 wherein:

said video display apparatus includes a plurality of projection unit modules connected together such that their respective screens define an enlarged image area for said apparatus.

29. A video display apparatus comprising:

a hollow housing including a closed projection volume disposed therein, said housing including opposed walls each comprising a video display screen;

a video projector disposed in said projection volume for projecting a video image, said video projector being operable to modulate light from a high intensity source;

a beam splitter disposed in said projection volume for receiving a beam from said projector and for splitting said beam to reflect half of said beam, respectively, toward each of said opposed screens; and an environmental control unit disposed in said projection volume comprising an isolated heat pump for controlling the temperature within said projection volume within a predefined range without exchanging external air into said projection volume.

30. A large scale video display apparatus for projecting video images onto opposed screens comprising:

a projection unit module comprising a hollow housing, opposed walls of said housing forming image projecting screens, each of said screens comprising at least one lens sheet defining at least one of a lenticular lens structure and a Fresnel lens structure, said hollow housing defining a projection volume;

a projector disposed in said projection volume for generating a modulated light image from a high intensity source;

a beam splitter disposed in said projection volume for reflecting approximately half of a beam generated by said projector toward one of said screens while the remaining half of said beam passes through said beam splitter; and a mirror disposed in said projection volume for receiving said remaining half of said beam and for projecting said remaining half of said beam onto the other of said screens.

31. A video billboard system comprising:

a plurality of projection unit modules connected together, each projection unit module comprising a hollow housing having an interior projection volume;

a liquid crystal light valve projector mounted in each of said housings, said projector having a cathode ray tube for controlling characteristic of a liquid crystal device, said liquid crystal device modulating light from a high intensity source;

a screen for each of said projection unit modules, said screens arranged to define an enlarged image area for said billboard system and for receiving the modulated light from each of said projectors, respectively;

a receiver coupled to said projectors, respectively;

transmitter means for transmitting commands to the receivers for controlling images to be projected onto said screens;

said screens each comprising lens sheets defining a lenticular lens structure and a Fresnel lens structure; and a remote control unit wirelessly coupled to said projectors for aligning images projected by said projectors onto said screens to provide an enlarged image for said billboard system.

* * * * *